United States Patent [19]

Brown

[11] Patent Number: 4,526,762
[45] Date of Patent: Jul. 2, 1985

[54] RECOVERY OF VANADIUM FROM ACIDIC SOLUTIONS THEREOF

[75] Inventor: Richard A. Brown, Trenton, N.J.
[73] Assignee: FMC Corporation, Philadelphia, Pa.
[21] Appl. No.: 192,132
[22] Filed: Sep. 29, 1980
[51] Int. Cl.³ .............................................. C01G 31/00
[52] U.S. Cl. ....................................... 423/63; 423/10; 423/64
[58] Field of Search ............................. 423/62, 63, 64; 75/101 BE

[56] References Cited

U.S. PATENT DOCUMENTS

| | | | |
|---|---|---|---|
| 2,211,119 | 8/1940 | Hixson et al. | 423/63 |
| 2,830,874 | 4/1958 | Long et al. | 423/63 |
| 3,190,720 | 6/1965 | Goren | 423/64 |
| 4,150,092 | 4/1979 | Pitts | 423/63 |

OTHER PUBLICATIONS

Price, "Per-Acids and Their Salts", Longmans, Green & Co., N.Y., 1912, pp. 45–58.
Nebergall et al, "College Chemistry", Raytheon Education Co., Boston, 1968, pp. 344–345.

Primary Examiner—Herbert T. Carter
Attorney, Agent, or Firm—Robert D. Jackson; Frank Ianno

[57] ABSTRACT

Vanadium is recovered from acidic solutions by oxidizing the vanadium with Caro's acid to the pentavalent state and obtaining the oxidized vanadium by solvent extraction.

4 Claims, 2 Drawing Figures

RECOVERY OF VANADIUM FROM ACIDIC SOLUTIONS THEREOF

This invention relates to the recovery of vanadium from aqueous acidic solutions, particularly from aqueous phosphoric acid.

The recovery of vanadium from acid solutions such as leach liquors by the solvent extraction thereof is well known. In the preferred procedure the vanadium is oxidized to the +5 valence state and the resulting pentavalent vanadium values extracted with an organic solvent. The vanadium is then stripped from the extractant and recovered as $V_2O_5$.

In the currently practiced commercial process of obtaining vanadium by the solvent recovery technique, sodium chlorate is used as the oxidant to form the solvent extractable pentavalent vanadium. Although generally effective, the process is objectionable in that the oxidation with sodium chlorate releases chloride ions which are extremely corrosive to metal. Consequently, plant equipment such as reaction vessels and piping must be made of corrosion resistant materials thereby adding to capital and operation costs.

It has been proposed to replace sodium chlorate with other oxidants. For instance, U.S. Pat. No. 3,305,322 describes the oxidation of vanadium in solution with sulfur dioxide and oxygen in the presence of ferric iron. Mangnese oxide ($MnO_2$) has also been used as an oxidant to provide soluble pentavalent vanadium. For various reasons, e.g., cost, performance, environmental problems, and the like, none of the vanadium oxidant systems thus far evaluated has proven satisfactory. Consequently, sodium chlorate, despite its undesirable traits, continues to be used as the oxidant in the recovery of vanadium by solvent extraction.

One oxidant which has many desirable features and properties is hydrogen peroxide. It is non-corrosive, forms no deleterious by-products and is available in commercial quantities at reasonable costs. Moreover, hydrogen peroxide is known to be an oxidant for vanadium. Thus, in Japanese Pat. No. 46-41211, there is disclosed the oxidation of vanadium with hydrogen peroxide in an acid-leach liquor to whereby the vanadium is precipitated as $V_2O_5$. However, the utilization of hydrogen peroxide in the vanadium solvent extraction process has not been reported. The silence of the prior art in this regard is not surprising in view of the reaction of hydrogen peroxide with pentavalent vanadium in acid media to form the stable and insoluble red monoperoxyvanadate, $VO(O_2)^+$. In fact, this reaction is the basis for the colorimetric determination of vanadium, thus demonstrating the ease of formation and stability of the monoperoxyvanadate: "Kinetic Studies of the Reactions of Peroxy Compounds of Chromium (VI), Vanadium (V), and Titanium (IV) in Acid Media" by Mato Orchanovic and Ralph G. Wilkins, JACS 89:2, January 1967, pages 278–282; also "Colorimetric Methods of Analysis" by F. D. Snell and C. T. Snell, Vol. II, November, 1955, D. Van Nostrand Co., Princeton, N.J., pages 453–454.

The adaptation of hydrogen peroxide as the oxidant in the solvent recovery of vanadium has been achieved by a process described in a pending application entitled "Recovery of Vanadium from Acidic Solutions" by R. Brown, et al and filed on even date herewith and assigned to the FMC Corporation. That process involves carrying out the vanadium oxidation in acidic media with hydrogen peroxide in the presence of an iron compound catalyst while avoiding excess peroxide in the reaction mixture to prevent formation of insoluble monoperoxyvanadate ($VO(O_2)^+$). However, the oxidation system aforesaid proved only marginally effective when applied to the solvent recovery of vanadium values from phosphoric acid solutions.

Vanadium is an undesirable component of wet process acid in that it must be held to low levels if the acid is used in making animal feed supplements. On the other hand, vanadium itself is a valuable material and wet acid could be an important source thereof. Thus far, a satisfactory method of recovering vanadium from wet acid has not been forthcoming.

Figure 1:
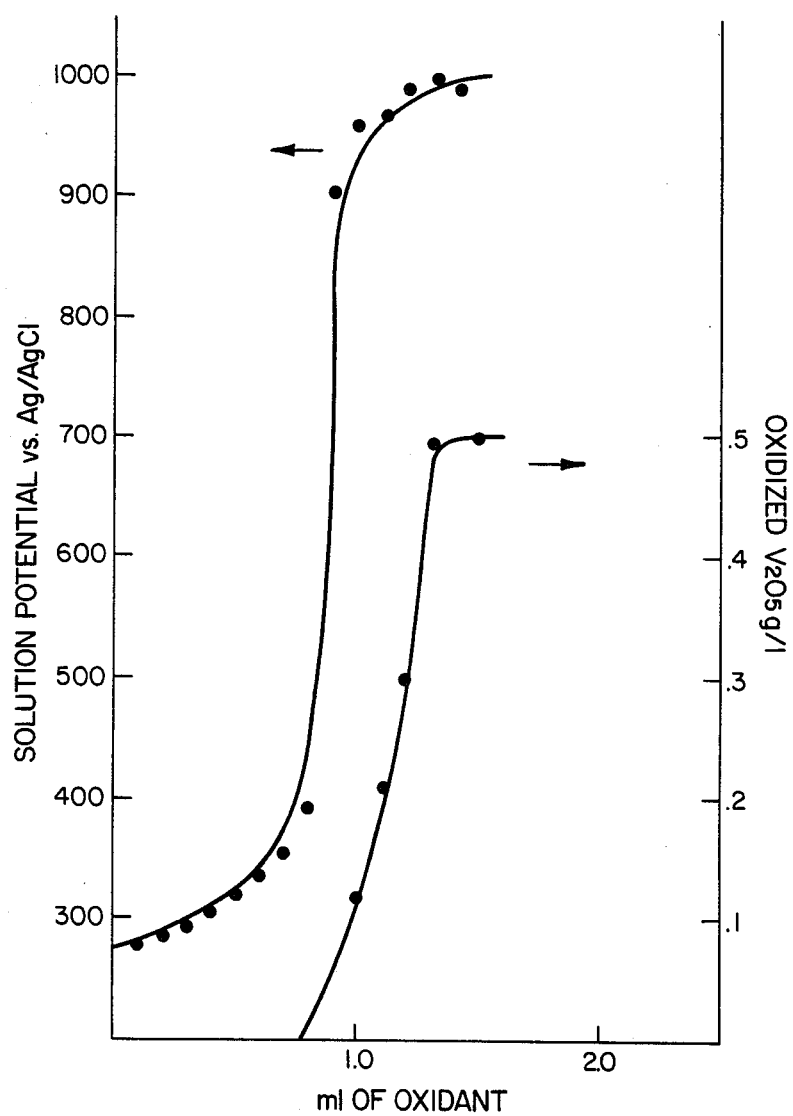
FIG. 1 shows the rise in solution potential when wet process phosphoric acid is oxidized with hydrogen peroxide.

It has now been discovered that vanadium in a phosphoric acid solution thereof can be oxidized to the pentavalent state by adding Caro's acid or a salt thereof to said phosphoric acid solution until the oxidation is complete.

An example of a phosphoric acid soltuion of vanadium is wet process phosphoric acid produced by the treatment of phosphate rock with sulfuric acid. Since the phosphate rock contains other mineral substances including vanadium, these are also dissolved by the acid leaching and appear as contaminants in the wet process acid. Particularly high in vanadium content is wet process acid made from western phosphate such as occurs in Idaho, Wyoming, Utah and Montana. A typical assay of wet process acid produced from western phosphate is as follows:

|  | Nominal % | Analyzed |
|---|---|---|
| $P_2O_5$ | 28 | — |
| $V_2O_5$ | 1.5 g/L | 1.91 g/L |
| $U_3O_8$ | 0.1 g/L | 0.123 g/L |
| Fe | 5 g/L | |
| $SO_4$ | 40 g/L | |
| F | 15 g/L | |
| Al | 5 g/L | |
| Mg | 4 g/L | |

In carrying out the invention, the Caro's acid is added to the phosphoric acid vanadium solution at a rate substantially commensurate with the rate of oxidation. This is to prevent accumulation of unreacted Caro's acid which is susceptable to decomposition if left too long in contact with catalytic metal ions, particularly iron ions normally present in phosphoric acid produced from phosphate rock by the wet process. The progress of the oxidation is followed by monitoring the solution potential. This is effected by periodically removing test samples and titrating them for total oxidized vanadium using ferrous ammonium sulfate with a diphenylamine indicator system. As the oxidation proceeds, the solution potential increases, signifying that the Caro's acid is being consumed and that further quantities of oxidant are required to sustain the reaction. When the solution potential reaches about 1200 mV, (vs Ag/AgCl) oxidation of the vanadium to the solvent extractable pentavalent state is essentially complete.

The herein oxidation of vanadium with Caro's acid can be operated as a batch or a continuous process.

Caro's acid can be employed as the free acid or it can be generated in situ by adding a caroate salt to the vanadium containing phosphoric acid. Caro's acid is formed in the known manner such as by mixing sulfuric acid with hydrogen peroxide or by the acid hydrolysis of a peroxydisulfate salt such as $(NH_4)_2S_2O_8$, $Na_2S_2O_8$ or $K_2S_2O_8$. Solutions of Caro's acid are used in the range of about 10 to 40%, preferably about 20 to 30%.

The oxidation of vanadium to the pentavalent state in aqueous acid with Caro's acid goes to completion in accordance with the following equation:

$$H_2O + H_2SO_5 + 2VO^{+2} \rightarrow 2VO_2^+ + H_2SO_4 + 2H^+$$

However, since the acidic vanadium solutions herein normally contain other oxidizable metal species, more Caro's acid will be required to reach the vanadium oxidation end potential of 1200 mV than is indicated by the stoichiometry aforesaid. For instance, when treating wet process phosphoric acid with Caro's acid, the iron and uranium ions are oxidized first and then the vanadium ions. Based strictly on the quantity of Caro's acid consumed in raising the vanadium to the pentavalent state, the oxidation is essentially quantitative. The oxidative efficacy of Caro's acid is amply demonstrated by the data in Table I summarizing the results of treating wet process phosphoric acid with various oxidizing agents.

In examining this data, it is readily apparent that in terms of oxidant consumed Caro's acid is strikingly superior to other peroxygen compounds and is even about 50% more effective than the commercially used sodium chlorate. Yet, Caro's acid is environmentally safe and does not give rise to undesirable by-products, breaking down to sulfuric acid normally present in wet process acid and which is far easier to handle than the highly corrosive chloride ion evolved by sodium chlorate.

Reference has previously been made to applicant's copending application disclosing a method for the oxidation of vanadium in acidic solutions to the pentavalent state using hydrogen peroxide as the oxidant. Mention has also been made that the process of the application was ineffective when applied to phosphoric acid solutions of vanadium such as wet process phosphoric acid. When the hydrogen peroxide was added to the wet process acid, the solution potential rose slowly from the initial reading of 280 mV to 380 mV, indicative of the oxidation of iron to ferric ions. On adding more hydrogen peroxide, the potential then rose sharply as the vanadium began to be oxidized, finally leveling off at about 1000 mV corresponding to an oxidized vanadium assay of 0.5 g/l $V_2O_5$. What is surprising is that neither the EMF nor the oxidized vanadium increased after the EMF leveled off on addition of more hydrogen peroxide. Only about 25% of the vanadium in wet acid solutions is oxidized to the pentavalent state by hydrogen peroxide.

Figure 2:
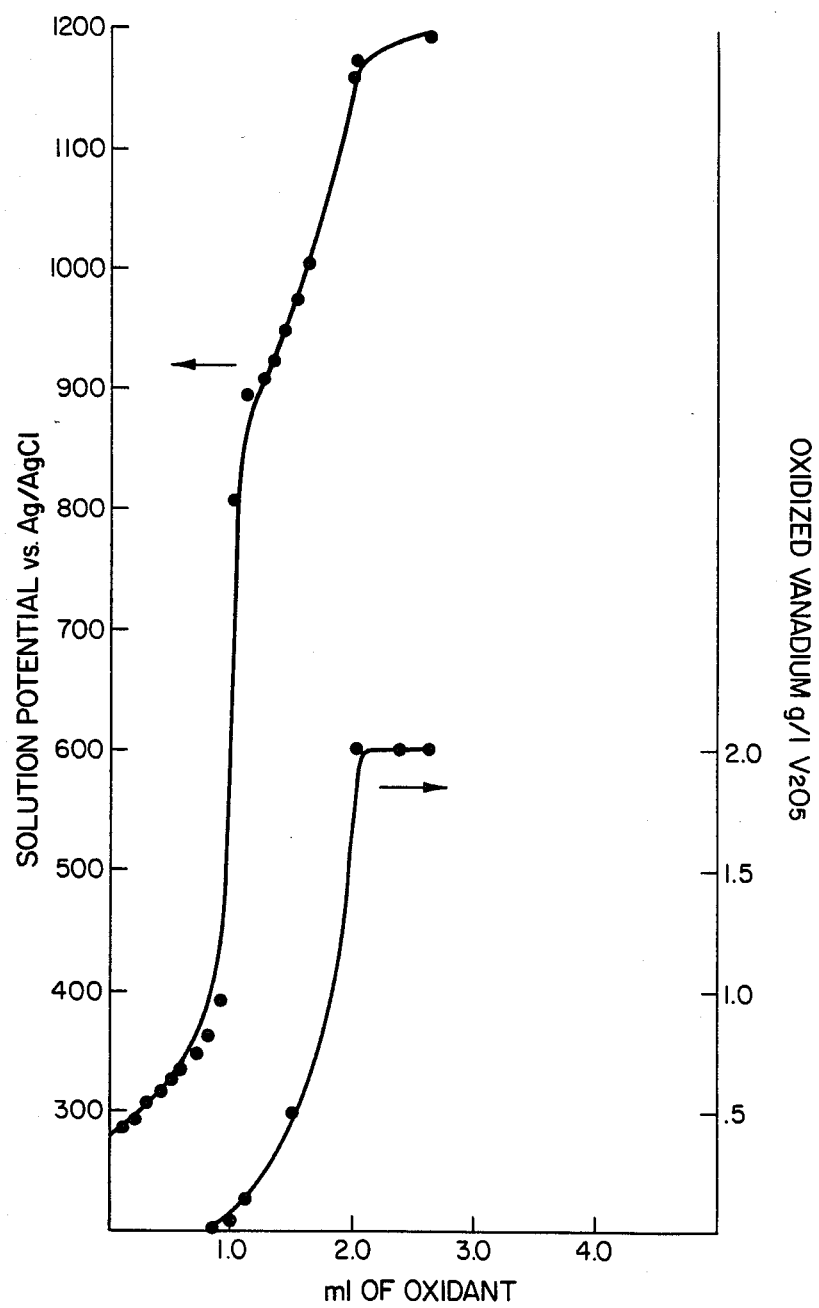
FIG. 2 shows the rise in solution potential when wet process phosphoric acid is oxidized with Caro's acid of the invention.

The oxidation of vanadium in phosphoric acid with Caro's acid is graphically depicted in FIG. 2. The shape of the oxidation curve is very similar to the peroxide curve shown in FIG. 1 until a potential of ~1000 mV is reached. At this point, the potential rises a second time to reach the final potential of ~1200 mV. The peroxide curve did not rise above 1000 mV. The level of oxidized vanadium also continues to rise with the addition of Caro's acid until all of the vanadium present is in the oxidized +5 state. The Caro's acid first oxidizes the iron present in the solution:

$$2H^+ + 2Fe^{+2} + H_2SO_5 \rightarrow 2Fe^{+3} + H_2SO_4 + H_2O$$

and then reacts with the vanadium, coverting it to the +5 state:

$$H_2O + H_2SO_5 + 2VO^{+2} \rightarrow 2VO_2^+ + H_2SO_4 + 2H^+$$

With Caro's acid, the reaction goes to completion.

The difference in the oxidation behavior of Caro's acid and hydrogen peroxide can be explained by the oxidation mechanism of both peroxygens. Caro's acid dissociates in solution to give the caroate anion:

$$H_2SO_5 \rightarrow HSO_5^- + H^+$$

which is the active species. Hydrogen peroxide, on the other hand, reacts fairly easily to form free radicals, especially in the presence of a metal catalyst:

$$H_2O_2 + Fe^{+2} \rightarrow Fe^{+3} + OH\cdot + OH^-.$$

However, the free radical formed is sensitive to catalytic decomposition:

$$Fe^{+3} + OH\cdot + H_2O_2 \rightarrow Fe^{+2} + H_2O + H^+ + O_2.$$

In wet acid, the catalytic decomposition of the hydrogen peroxide apparently is the dominant reaction once the solution potential of 1000 mV is reached.

Since wet process phosphoric acid is produced, by the acidulation of phosphate rock, metals present in the rock are dissolved. The significant metals that occur as impurities are uranium, iron, and vanadium. Uranium and vanadium can be recovered as valuable metal resources, using solvent extraction processing. However, in order for both metals to be recovered, they must be oxidized to the proper state. In the raw green acid all metals are either partially or fully reduced. Caro's acid can be used for the complete oxidation process or as a supplement to air oxidation. When Caro's acid is used for the complete oxidation, the process is divided into two stages. In the first stage Caro's acid is added until a potential of 500 mV (vs Ag/AgCl) is reached, completing the oxidation of uranium and most of the iron but leaving the vanadium reduced. The uranium is then extracted with a diethyl hexyl phosphoric acid/trioctyl phosphine oxide (DEPA/TOPO) solvent system. The raffinate from the uranium extraction is then further oxidized with Caro's acid until a potential of ~1200 mV is reached (vs Ag/AgCl). At this point the oxidized vanadium is extracted with TOPO or any other suitable solvent. When Caro's acid is used as a supplemental oxidant, the raw green acid is first air oxidized to convert the uranium to its extractable form. The raffinate from the uranium extraction is oxidized as described above and the vanadium extracted.

Reference is now made to the following non-limiting examples.

EXAMPLE 1

212 g/l Caro's acid, prepared by combining a 7:1 weight ratio of 96% sulfuric acid and 70% hydrogen peroxide, was added to wet process phosphoric acid containing 1.9 g/l V as $V_2O_5$, 0.123 g/l U as $U_3O_8$ and 5.0 g/l Fe and had a potential of 285 mV (vs Ag/AgCl). 6 g $H_2SO_5$/liter of green acid was required to reach a potential of 1194 mV. Analysis of the solution showed that all the vanadium was oxidized.

EXAMPLE 2

Green acid containing 1.9 g/l V as $V_2O_5$, 0.123 g/l U as $U_3O_8$ and 5.0 g/l Fe was oxidized with air until a potential of 506 mV was reached. At this point all the uranium and iron were essentially oxidized. A Caro's acid solution containing 212 g/l $H_2SO_5$, made by combining 96% $H_2SO_4$ and 70% $H_2O_2$ in the ratio of 7 parts by weight $H_2SO_4$ to 1 part by weight $H_2O_2$, was added to the air oxidized green acid. 1.3 g $H_2SO_5$ per liter of air oxidized green acid was required to reach the desired potential of 1200 mV vs Ag/AgCl.

TABLE I

| Oxidant Used | EMF Reached | Oxidized $V_2O_5$ (g/L) | Single Extraction Raffinate | Oxidant Consumed g/g $V_2O_5$ | Theor. Oxidant g/g $V_2O_5$ |
| --- | --- | --- | --- | --- | --- |
| Chlorate | 1160 mv | 1.90 | .62 | .30 | .192 |
| $H_2O_2$ | 960 mv | .50 | 1.09 | 1.65 | .187 |
| $H_2SO_5$ | 1215 mv | 1.91 | .60 | .68 | .62 |
| $(NH_4)_2S_2O_8$ | 1185 mv | 1.90 | .60 | 3.82 | 1.24 |

I claim:
1. The process of recovering vanadium from phosphoric acid in which at least part of the vanadium is in the +4 valence state comprising: contacting the phosphoric acid with sufficient Caro's acid to oxidize the vanadium to the +5 valence state and recovering the vanadium in the +5 state by solvent extraction.
2. The process according to claim 1 wherein the phosphoric acid is produced by the wet process.
3. The process according to claim 2 wherein the concentration by weight of the Caro's acid is about 10% to 40%.
4. The process of recovering vanadium from wet process phosphoric acid in which at least part of the vanadium is in the +4 valence state comprising: adding to the phosphoric acid, an aqueous solution of Caro's acid having a concentration by weight of about 20% to 30% in order to oxidize the vanadium to the +5 valence state; continuing adding the Caro's acid until the potential of the reaction reaches about 1200 mV, and recovering the oxidized vanadium by solvent extraction.

* * * * *